March 21, 1967 P. BOLAND ETAL 3,309,912
POROSITY DATA APPARATUS
Filed Sept. 20, 1963 5 Sheets-Sheet 2
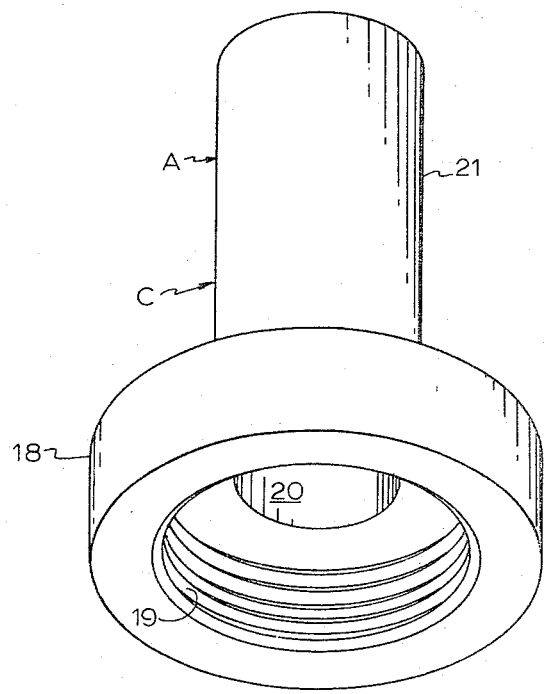
FIG.2
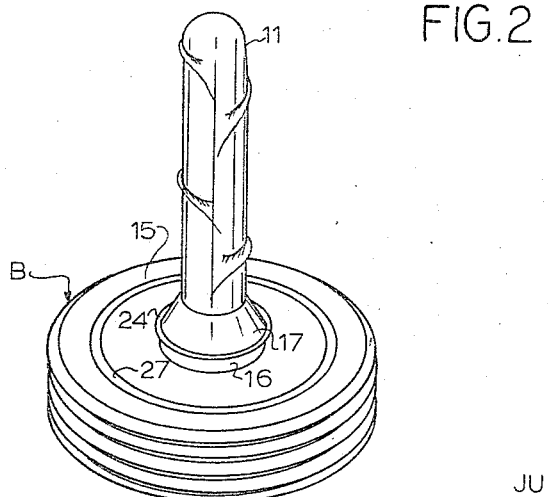
INVENTORS
PAUL BOLAND
JULIAN D. FLEMING JR.
JOE N. HARRIS
BY
Newton, Hopkins & Jones
ATTORNEYS

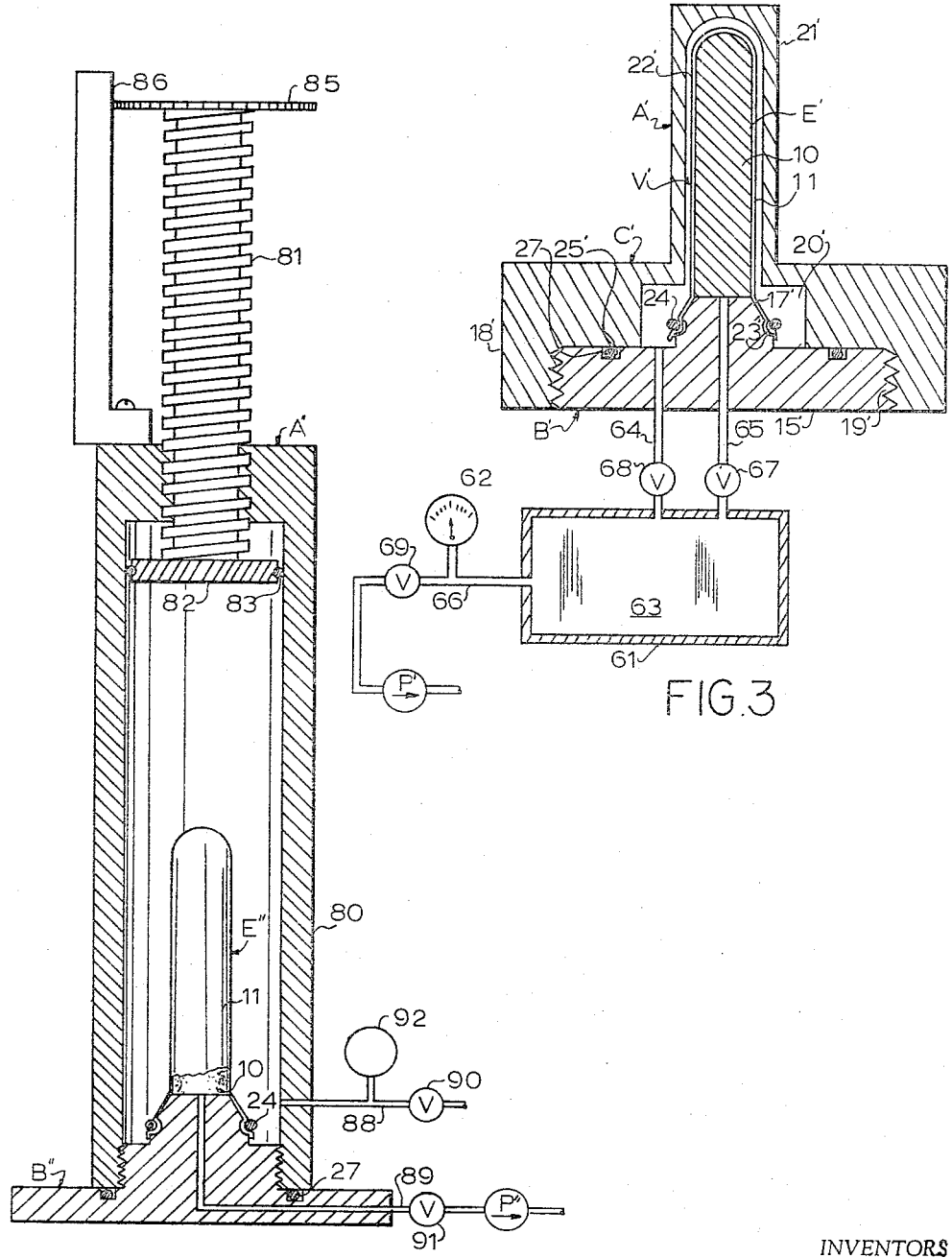

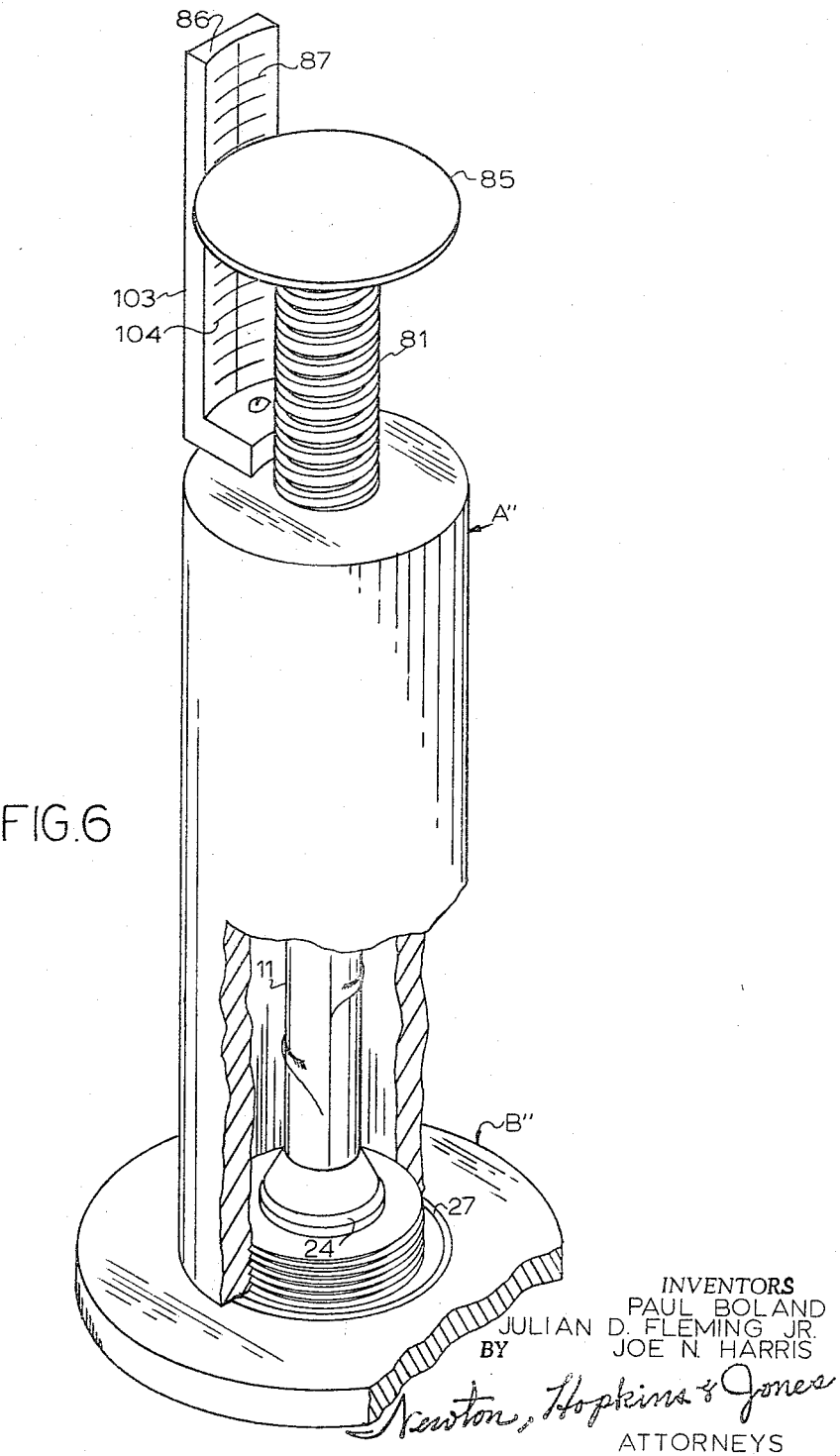

United States Patent Office 3,309,912
Patented Mar. 21, 1967

3,309,912
POROSITY DATA APPARATUS
Paul Boland and Julian D. Fleming, Jr., De Kalb County, and Joe N. Harris, Atlanta, Ga., assignors to Georgia Tech Research Institute, Atlanta, Ga., a corporation of Georgia
Filed Sept. 20, 1963, Ser. No. 310,196
11 Claims. (Cl. 73—38)

This invention relates to an apparatus for and a method of determining the porosity of solid materials and more particularly, to apparatus for and a method of determining the porosity of solid materials using only gas displacement.

It is frequently necessary to determine the porosity of a solid material. For example, the accurate and convenient determination of the porosities of solid materials is necessary in order to predict fluid permeation parameters in industrial applications which use solid materials in leaching, drying, absorption, dialysis or gas effusion. Other requirements for determining the porosities of solid materials will be readily apparent from these examples and the requirements for determining the porosities of solid materials will increase as increased attention is directed to solid materials in the future.

The porosity of a solid material is calculated by dividing the pore volume or the volume of the pores in a specimen of the solid material by the bulk volume or volume of the specimen considered as a non-porous material. It has generally been determined in the past by the liquid-displacement technique involving the saturation of the pores of the solid with a liquid which permeates the pores of the solid. In the liquid-displacement technique, the dry weight and wet weight of a specimen of a solid material is ascertained and when the density of the permeating liquid is known, it is possible to calculate the volume of the voids in the specimen of solid material. When the bulk volume of the specimen is determined by immersion of the specimen in a non-permeating liquid such as mercury, it is possible to calculate the porosity of the solid material.

The difficulty with the liquid-displacement technique of determining the porosity of a solid material is that the technique requires the immersion of the specimen of solid material in a boiling liquid in order to saturate the pores of the specimen. Thus, the liquid displacement technique cannot be readily used with loosely bound solids such as certain types of oil well drilling cores and unfired ceramics. Moreover, the porosity values for a solid material obtained by the liquid-displacement technique are not true porosity values since complete liquid saturation of pores is almost impossible to obtain.

To avoid these difficulties with the liquid-displacement technique for determining the porosity of a solid material, a combination gas-liquid displacement technique has also previously been used. In the combination gas-liquid displacement technique, a specimen of a solid material is placed in a specimen chamber of known volume, the specimen chamber is evacuated of all gas, and the gas volume necessary to refill the specimen chamber is measured. The difference between the known volume of the specimen chamber and the volume of gas necessary to refill the specimen chamber with the specimen positioned within the chamber is the solid volume of the specimen of solid material. The solid volume of the specimen of solid material is the volume of only the solid matter in the specimen and when the bulk volume is independently ascertained and the solid volume subtracted from it, the pore volume of the solid material is determined.

The combination gas-liquid displacement technique provides good accuracy since a gas permeates the pores of the specimen of solid material completely. Moreover, since placing the specimen of solid material in a boiling liquid is unnecessary, porosity measurements can be made on solids such as oil well drilling cores and unfired ceramics without the danger that the solids will be degraded by the boiling liquid. However, this combination gas-liquid displacement technique possesses the disadvantage that both liquid displacement and gas displacement must be used. Thus, the porosity of a specimen of solid material can not be determined as a continuous process using a single apparatus set-up. Moreover, the combination gas-liquid displacement technique still has the disadvantage that bulk volume is customarily determined by immersion of the specimen in mercury and this frequently causes contamination of the specimen of solid material by mercury.

The gas-displacement method of determining the porosity of a solid material disclosed herein determines both the solid volume and the bulk volume of a specimen of solid material by gas displacement and the apparatus disclosed is particularly suited to the method of the invention. Moreover, one embodiment of the apparatus disclosed herein permits the void volume of a specimen of a solid material to be indicated directly without the necessity of mentally subtracting solid volume from bulk volume as a separate additional step.

However, regardless of the specific embodiment of the apparatus used, the method of the invention permits the porosity of a specimen of solid material to be determined to a high degreee of accuracy in a convenient manner without the contamination of the specimen and without ascertaining solid volume and bulk volume by separate types of procedures and apparatus set-ups. Furthermore, the apparatus of the invention permits porosity of a solid material to be determined without the danger of degrading by boiling liquid and even when the solid material is in powdered form.

These and other features and advantages of the invention will be more clearly understood from the following detailed description and the accompanying drawings in which like characters of reference designate corresponding parts in all figures and in which:

FIG. 2 is an exploded perspective view of the specimen chamber of the apparatus shown in FIG. 1.

FIG. 3 is a section view of an embodiment of the apparatus of the invention in which the mercury manometer shown in FIG. 1 is replaced by a comparison chamber and a pressure gauge.

FIG. 4 is a section view of an embodiment of the apparatus of the invention using a variable volume specimen chamber.

FIG. 6 is a perspective view, partially cut away, of the variable volume specimen chamber of the invention and shows in particular the construction of the variable volume pressure chambers in FIG. 4 and in FIG. 5 and in general the construction of the variable volume gas chamber in FIG. 5.

Figure 1:
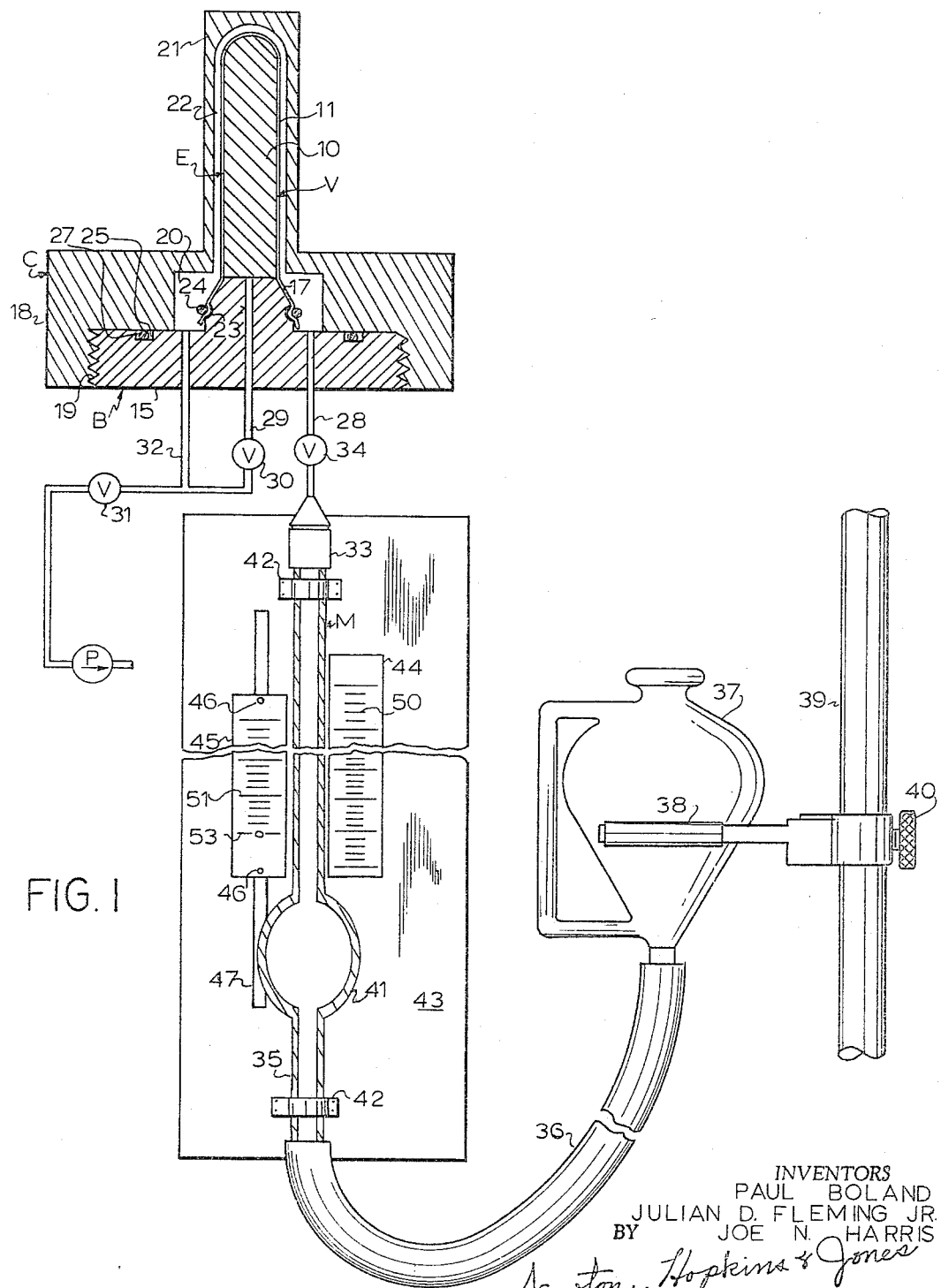
FIG. 1 is an elevation view partially in section of a preferred embodiment of the apparatus of the invention with the pressure measuring portion of the apparatus positioned adjacent to the specimen chamber of the apparatus for convenience of illustration.

These figures and the following detailed description disclose a preferred specific embodiment of the invention but the invention is not limited to the details disclosed since it may be embodied in other equivalent forms.

The invention disclosed herein is best understood in terms of the method of the invention. The method of the invention may be adapted to each of the embodiments of the apparatus of the invention disclosed herein and comprises determining the volume of a gas displaced by a specimen 10 of a solid material when the gas is prevented from entering the pores of the specimen 10 and determining the volume of a gas displaced by the specimen 10 when the gas is permitted to enter the pores of the specimen 10. When the volume of the sealing means used to prevent the entry of a gas into the pores of the specimen 10 is known, the volume of the gas displaced when the gas is prevented from entering the pores of the specimen 10 minus the known volume of this sealing means is the bulk volume of the specimen 10.

The volume of the gas displaced when the gas is permitted to enter the pores of the specimen 10 is the solid volume of the specimen 10. The solid volume of the specimen 10 is the bulk volume of the specimen 10 minus the pore volume. Thus, the pore volume of the specimen 10 can be determined by simply subtracting the solid volume obtained by gas displacement from the bulk volume obtained by gas displacement. Once pore volume is determined in this manner, this pore volume and the bulk volume obtained by gas displacement can be used in known manner to calculate the porosity of the specimen of solid material.

Using the method of the invention, the porosity of a solid material may be determined by enclosing the specimen 10 in a sealing means of known volume such as a shield 11 which conforms to the bulk shape of the specimen 10 and through which gas will not pass, ascertaining the volume of the gas displaced by the specimen 10 and the sealing means such as the shield 11, subtracting the known volume of the sealing means such as the shield 11 from the volume of gas displaced by the specimen and sealing means to obtain the bulk volume of the specimen 10, ascertaining the volume of the gas displaced when the gas is permitted to enter the pores of the specimen 10, subtracting the bulk volume of the specimen from the volume of the gas displaced when the gas is permitted to enter the pores of the specimen 10 to obtain the pore volume of the specimen, and using the pore volume and bulk volume obtained to calculate in known manner the porosity of the solid material.

Although the apparatus of the invention is well adapted to many uses involving the ascertaining of the volume of a gas displaced by a solid material, it is particularly adapted to the method of the invention. This is because the apparatus provides a convenient means for providing a specimen 10 with a sealing means through which gas will not pass and which conforms to the shape of the specimen 10. In all four embodiments of the apparatus of the invention, the sealing means is the shield 11.

The shield 11 is essentially a shell of pliable material having the general configuration of the specimen 10. Any suitable pliable material such as rubber or vinyl plastic which is impervious to gas may be used for the shield 11. The shield 11 is most conveniently formed using known techniques by forming the particular material selected for the shield 11 over a mandrel (not shown) of stainless steel having the general configuration of the specimen 10.

Regardless of the known technique used to form the shield 11, the shield 11 is closed at one end and open at the other end. Thus, when the shield 11 is placed over the specimen 10 and the specimen 10 is placed upon a specimen platform 12 with the shield 11 enclosing it and with the open end of the shield 11 sealed below the specimen 10, the specimen 10 is completely enclosed within a gas tight envelope E. The method of the invention requires that the volume of the shield 11 be known and this volume can be readily determined once the shield 11 is formed in the manner described by using known gas or liquid displacement techniques.

The envelope E is formed within a specimen chamber A having a base B and a cover C. In the embodiment of the apparatus of the invention shown in FIG. 1 the base B comprises a threaded circular platform plug 15, a cylindrical member 16 integral with and extending above the platform plug 15 and having its centerline coinciding with the centerline of the platform plug 15, and a truncated cone 17 integral and continuous with the cylindrical member 16 and having its centerline coinciding with the centerline of the platform plug 15. The cover C comprises a lower cylindrical shell 18 having a threaded recess 19 into which the platform plug 15 is threadably insertable and a small recess 20 above and continuous with the threaded recess 19, and an upper cylindrical shell 21 integral with the lower cylindrical shell 18 and having a specimen recess 22 continuous with the small recess 20 of the lower cylindrical shell 18. The specimen recess 22 has a contour approximating, but larger than, the specimen 10. The specimen platform 12 is the upper surface of the truncated cone 17 and when the specimen 10 is placed upon the specimen platform 12 enclosed within the shield 11, the open end of the shield 11 extends downward over the truncated cone 17 and along the cylindrical member 16 toward the platform plug 15.

The cylindrical member 16 has a groove 23 extending around its outer circumference immediately beneath the truncated cone 17 and when the shield 11 is positioned over the specimen 10 and downward along the cylindrical member 16, a ring 24 of resilient material such as rubber is placed around the lower open end of the shield 11 to force the shield 11 into the groove 23. The result of this arrangement is that the specimen 10 is enclosed within the gas tight envelope E as defined by the shield 11, the truncated cone 17, and the cylindrical member 16 above the ring 24.

When the platform plug 15 is threadably inserted into the threaded recess 19 of the lower cylindrical shell 18 with the specimen 10 and shield 11 positioned above the truncated cone 17 in the manner described above, the specimen 10 and the shield 11 enclosing it are both enclosed within the small recess 20 of the lower cylindrical shell 18 and the specimen recess 22 of the upper cylindrical shell 21. A channel 25 is formed in the upper surface 26 of the platform plug 15. The channel 25 is concentric with the cylindrical member 16 and a sealing ring 27 of rubber or other resilient material is placed in the channel 25 to provide a gas tight seal between the platform plug 15 and the lower cylindrical shell 21 when the platform plug 15 is threadably inserted into the threaded recess 19 in the lower cylindrical shell 18. The result of this arrangement is that the specimen 10 and the shield 11 are enclosed by the base B and the cover C of the specimen chamber A within a gas-tight cavity V substantially defined by the specimen recess 22 of the upper cylindrical shell 21, and the small recess 20 of the lower cylindrical shell 18.

The envelope E is connected in known manner to a vacuum pump P of known type by a gas-tight first connecting means 29 extending from the pump P through the platform plug 15, the cylindrical member 16 and the truncated cone 17 to the specimen platform 12. The first connecting means 29 contains a valve 30 and a valve 31 in series between the pump P and the envelope E. The valves 30 and 31 are of known type and when open, the valves 30 and 31 place the envelope E in communication with the pump P. When closed, the valves 30 and 31 prevent the passage of gas to or from the envelope E through the connecting means 29.

A second connecting means 32 extends through the platform plug 15 and connects the cavity V to the first connecting means 29 between the valve 30 and the valve 31. Similarly, a third connecting means 28 extends through the platform plug 15 and connects the cavity V to a fitting 33 at the pressure responsive end of a mercury column manometer M of known type. A valve 34 is positioned in the third connecting means 28 between the fitting 33 of the mercury column manometer M and the cavity V. When open, the valve 34 permits the manometer M to be responsive to gas pressure in the cavity V and when closed, the valve 34 isolates the manometer M from the cavity V.

The manometer M is of known type having a glass column 35 and a displacement bulb 41 connected by tubing 36 to a levelling bulb 37. The levelling bulb 37 is supported in a clamp 38 of known type which is slidably movable on a standard 39. The vertical position of the clamp 38 along the length of the standard 39 is fixed by a set screw 40.

The glass column 35 of the manometer M is fixedly positioned by clips 42 on a board 43 of wood or similar material. Fixedly positioned on the board 43 adjacent and to one side of the glass column 35 is a bulk volume scale 44. Positioned on the board 43 on the opposite side of the glass column 35 is a pore volume scale 45. The pore volume scale 44 is arranged for slidable movement along the length of the glass column 35 by extending pins 46 from the pore volume scale 45 through a slot 47 which extends through the board 43 parallel to the glass column 35. The position of the pore volume scale 45 along the length of the glass column 35 is adjustably fixed by wing nuts (not shown) on the extending ends of the pins 46 which are tightened against the board 43.

When this embodiment of the apparatus of the invention is used to determine the pore volume and the bulk volume necessary to calculate the porosity of a specimen 10 of a solid material, the specimen 10 is positioned within the specimen chamber A in the manner described above. This places the specimen 10 within the envelope E and within the cavity V. Initially, the pump P is not operating and the valves 30, 31 and 34 are open. As a result, there is air at atmospheric pressure in the envelope E, the cavity V, and the glass column 35 of the manometer M.

Once atmospheric pressure is established in the apparatus in this manner, the valve 34 is closed and the pump P is operated to remove substantially all air from the envelope E and the cavity V while leaving air at atmospheric pressure in the glass column 35. When the air is substantially removed from the envelope E and the cavity V, the valves 30 and 31 are closed and the valve 34 is opened. This causes the air in the glass column 35 to expand into that portion of the cavity V not occupied by the specimen 10 and the shield 11.

Since the known volume of the shield 11 is constant and since the vacuum still in the envelope E causes the shield 11 to closely adhere to the bulk shape of the specimen 10, the additional volume into which the air in the glass column 35 expands when the valve 34 is opened is related to the bulk volume of the specimen 10. This is because the larger the bulk volume of the specimen 10, the smaller the portion the cavity V not occupied by the specimen 10 and the shield 11 into which the air expands.

After the air has expanded into that portion of the cavity V not occupied by the specimen 10 and the shield 11, the levelling bulb 37 is raised to again place the air at atmospheric pressure. As the levelling bulb 37 is raised and in accordance with the known principles of gas behavior, the mercury in the glass column 37 moves upward in the glass column 37 to a position which reduces the volume of glass column 37 above the mercury by an amount equal to the additional volume into which the air expanded when the valve 34 opened. Thus, the position of the mercury in the glass column 37 after the valve 34 is opened and atmospheric pressure is reestablished is related to the volume of the cavity V into which the air expanded when the valve 34 opened and to the bulk volume of the specimen 10.

The bulk volume scale 44 has indicia 50 positioned along its length using substantially the foregoing procedure with calibrating specimens (not shown) of known volume in the specimen chamber A in place of a specimen 10 and with the constant volume of the shield 11 taken into consideration. Thus, the indicia of the bulk volume scale 44 are placed to correspond to the positions of the mercury in the glass column 37 when various indicated volumes are within the cavity V. As a result the bulk volume scale 44 indicates a particular volume when a specimen 10 is within the specimen chamber A and after the valve 34 is opened and atmospheric pressure is reestablished. It will be understood that with proper selection of the indicia, the bulk volume scale 44 can indicate directly the bulk volume of the specimen 10.

After the bulk volume of the specimen 10 is read directly from the bulk volume scale 44, the valve 30 is opened to permit the air to expand into the envelope E. The volume into which the air expands is the volume of the pores in the specimen 10 and when the levelling bulb 37 is again raised to reestablish atmospheric pressure in the glass column 37, the cavity V, and the envelope E, the mercury in the glass column 37 moves upward to a position which reduces the volume of the gas column above the mercury by an amount equal to the volume of the pores into which the air expanded when the valve 30 opened.

Since the bulk volume scale 44 is calibrated in the units of volume which each position of the mercury represents, the pore volume of the specimen 10 can now be determined by subtracting the volume indicated by the bulk volume scale 44 before opening valve 30 from the volume indicated after opening valve 30 and reestablishing atmospheric pressure. However, the pore volume scale 45 permits bulk volume to be read directly.

The pore volume scale 45 has indicia 51 arranged in the same manner as the indicia 50 of the bulk volume scale 44 in that each indicium 51 indicates the particular volume represented by a particular motion of the mercury in the glass column 37 and as established using known techniques and calibrating specimens (not shown) of known size. Before the valve 30 is opened, the pore volume scale 45 is moved upward on the board 43 so as to place its lowermost indicium 53 at the uppermost edge of the mercury in the glass column 37. Thus, when the mercury moves upward in the glass column 35 following the opening of the valve 30, the pore volume scale 45 indicates the volume of the pores in the specimen 10 from a standard reference rather than from a previous volume.

After pore volume has been read directly from the pore volume scale 45 and bulk volume has been read directly from the bulk volume scale 44, the porosity of the specimen 10 can be calculated in known manner. It will be understood that in calibration of the scales 44 and 45, the volumes of connecting means 28, 29 and 30 which are joined to the cavity V, the envelope E, and the glass column 35 when the valves 30, 31 and 34 are open or closed are taken into consideration. Thus, the apparatus of FIG. 1 permits the highly accurate determination of the porosity of a solid material.

The embodiment of the apparatus of the invention shown in FIG. 3 is substantially the same as the embodiment of the apparatus of the invention shown in FIG. 1 with the exception that the manometer M is replaced by a comparison chamber 61 and a pressure gauge 62 of known type. The comparison chamber 61 is a gas-tight box-like structure having an interior 63 of known volume joined to the cavity C' of the specimen chamber A' by a first connecting means 64, to the envelope E' by a second connecting means 65, and to the pump P' by a third connecting means 66. A valve 67 is between the comparison chamber 61 and the envelope E', a valve 68 is between the comparison chamber 61 and the cavity C', and a valve 69 is between the comparison chamber 61 and the pump P'. The pressure gauge 62 is connected to the third connecting means 66 between the comparison chamber 61 and the valve 69 so as to be constantly responsive to the pressure of a gas in the pressure chamber 61.

When the apparatus of the invention shown in FIG. 3 is used to obtain the pore volume and bulk volume of a specimen 10 necessary to calculate the porosity of the specimen 10, the specimen 10 is enclosed within the shield 11 and is positioned within the specimen chamber A' in exactly the same manner as a specimen 10 is positioned within the specimen chamber A. The pump P' is operated to evacuate substantially all the air from the cavity C', the envelope E', the comparison chamber 61. Next, the valves 67 and 68 are closed and air is permitted to enter the comparison chamber 61 through the pump P'.

After air has entered the comparison chamber 61 with the valves 67 and 68 closed, the valve 69 is closed and the pressure indicated by the pressure gauge 62 is recorded. Next, the valve 68 is opened to permit the air in the comparison chamber 61 to expand into the cavity C'. The expansion of air from the comparison chamber 61 into the cavity C' causes the pressure indicated by the pressure gauge 62 to drop in accordance with known principles of gas behavior and the relationship between air volume and pressure before and after the valve 68 is opened can be expressed as:

$$P_1V_c = P_2(V_c + V_m - V_b) \qquad (1)$$

$P_1$ is the pressure indicated by the pressure gauge 62 before the valve 68 is opened and $P_2$ is the pressure indicated by the pressure gauge 62 after the valve 68 is opened. $V_c$ is the known volume of the comparison chamber 61 and $V_m$ is the known volume of the cavity C'. Thus, the only unknown in the relationship expressed by Equation 1 is the bulk volume $V_b$ of the specimen 10 and the relationship permits the bulk volume $V_b$ to be computed in the usual customary manner.

After the bulk volume of the specimen 10 has been determined as described above, the valve 67 is opened. The resulting expansion of the air into the envelope E' and into the pores of the specimen 10 causes the pressure indicated by the pressure gauge 62 to drop again and the relationship between air volume and pressure before and after the valve 67 is opened can be expressed in known manner as:

$$P_2(V_c + V_m - V_b) = P_3(V_c + V_m + V_p - V_b) \qquad (2)$$

Since $P_3$ is the pressure indicated by the pressure gauge 62 after the valve 67 is opened and since $P_2$, $V_c$, $V_m$ and $V_b$ are known or have been previously read or computed, this relationship of Equation 2 permits the pore volume, $V_p$, of the specimen 10 to be computed. Thus, the apparatus of the invention shown in FIG. 3 permits pore volume and bulk volume to be determined using only gas displacement and simple well-understood gas volume-pressure relationships. It will be understood that in calibrating and using this embodiment of the apparatus, the volumes of the connecting means 64, 65, and 66 are known and taken into consideration so as to insure highly accurate results.

In the embodiment of the apparatus of the invention shown in FIG. 4, a variable volume pressure chamber A″ is used. The variable volume pressure chamber A″ has a base B″ substantially identical to the base B of the pressure chamber A and differs from those embodiments of the invention shown in FIGS. 1 and 3 principally in that the covers C and C' are replaced by a hollow cylinder 80 which threadably engages the base B″ to enclose the specimen 10 within a cavity C″. A threaded shaft 81 extends through the upper end of the hollow cylinder 80 and at the lower end of the threaded shaft 81 within the hollow cylinder 80 is a sealing disc 82. A ring 83 of rubber or other resilient material is positioned in the circumference of the sealing disc 82 and the sealing disc 82 and ring 83 serve to define the upper gas-tight end of the cavity C″ within the hollow cylinder 80. Thus, in the embodiment of the apparatus of the invention shown in FIG. 4, the size of the cavity C″ is variable in accordance with the the vertical position of the sealing disc 82 within the hollow cylinder 80 as determined by the rotation of the shaft 81.

At the upper end of the shaft 81 is a marking disc 85 and fixedly mounted to the upper end of the hollow cylinder 80 adjacent and parallel to the extending end of the shaft 81 is a scale standard 86. The volume of the cavity C″ for various positions of the sealing disc 82 is calculated using known techniques and the scale standard 86 carries indicia 87 which indicate the volume of the cavity C″ when the sealing disc 83 is at various positions within the hollow cylinder 80.

In the embodiment of the apparatus shown in FIG. 4, the cavity C″ is connected to the atmosphere by a first connecting means 88 and the envelope E″ is connected to a vacuum pump P″ by a second connecting means 89. A valve 90 is in the first connecting means 88 between the cavity C″ and the atmosphere and a valve 91 is in the second connecting means 89 between the envelope E″ and the pump P″. A pressure gauge 92 is joined to the first connecting means 88 between the cavity C″ and the valve 90 so as to be in constant communication with the cavity C″ in the pressure chamber A″.

When this embodiment of the apparatus of the invention is used to obtain the pore volume and bulk volume necessary to calculate the porosity of a solid material, the specimen 10 of the solid material is enclosed within the shield 11 and positioned on the specimen platform 12″ as described above with respect to other embodiments of the apparatus of the invention. With the specimen 10 in position and enclosed within the shield 11 to form the envelope E″ and with the valves 90 and 91 open, a partial vacuum is drawn by the pump P″ in the envelope E″. Since there is atmospheric pressure in the cavity C″, this partial vacuum insures that the shield 11 closely conforms to the bulk shape of the specimen 10.

After the partial vacuum has been established in the envelope E″, the valves 90 and 91 are closed and the initial pressure indicated by the pressure gauge 92 when the sealing disc 82 is in its uppermost position is recorded. Next, shaft 81 is rotated until the pressure reading of the pressure gauge 92 indicates twice the initial pressure. This second pressure and the volume of the cavity C″ indicated by the marking disc 85 are noted and in accordance with the known principles of gas behavior, the relationship between air pressure and volume before and after the downward motion of the sealing disc 82 can be expressed as follows:

$$P_1(V_m - V_b) = 2P_1(V_{mr} - V_b) \qquad (3)$$

or $$V_b = 2V_{mr} - V_m \qquad (4)$$

$V_m$ is the indicated volume of the cavity C″ before the sealing disc 82 is lowered and $V_{mr}$ is the indicated volume of the cavity C″ after the sealing disc 82 is lowered. Since $V_m$ and $V_{mr}$ are both read from the scale standard 86, the bulk volume, $V_b$, can be easily and conveniently computed. The resulting bulk volume, $V_b$, includes the volume of the shield 11 and since the volume of the shield 11 is known, a highly accurate bulk volume for the specimen 10 can be obtained by simple subtraction.

The pore volume of the specimen 10 is determined by placing the specimen 10 in the specimen chamber A″ without the shield 11 and repeating the operative steps described above for determining bulk volume. The relationship between air pressure and volume before and after the downward motion of the sealing disc 82 can be expressed as follows:

$$P_1(V_m - V_s) = 2P_1(V_{mr} - V_s) \qquad (5)$$

or $$V_s = 2V_{mr} - V_m \qquad (6)$$

$V_m$ is once again the indicated volume of the cavity C″ before the sealing disc 82 is lowered and $V_{mr}$ is once again the indicated volume of the cavity C″ after the sealing disc 82 is lowered to double the pressure in the cavity C″. However, only the solid volume of the specimen 10 is displacing the air in the cavity C″. Thus, it is the solid volume $V_s$ of the specimen 10 which is easily and conveniently obtained from the relationship expressed by Equation 6 for when the shield 11 is not enclosing the specimen 10. When the bulk volume previously obtained is subtracted from the solid volume, $V_s$, the pore volume of the specimen 10 is determined and can be used with bulk volume to compute the porosity of the specimen 10 in known manner. It will be understood that in calibrating and using this embodiment of the apparatus, the volumes of the connecting means 88 and 89 are known and taken into consideration so as to provide highly accurate results with this embodiment of the invention.

Figure 5:
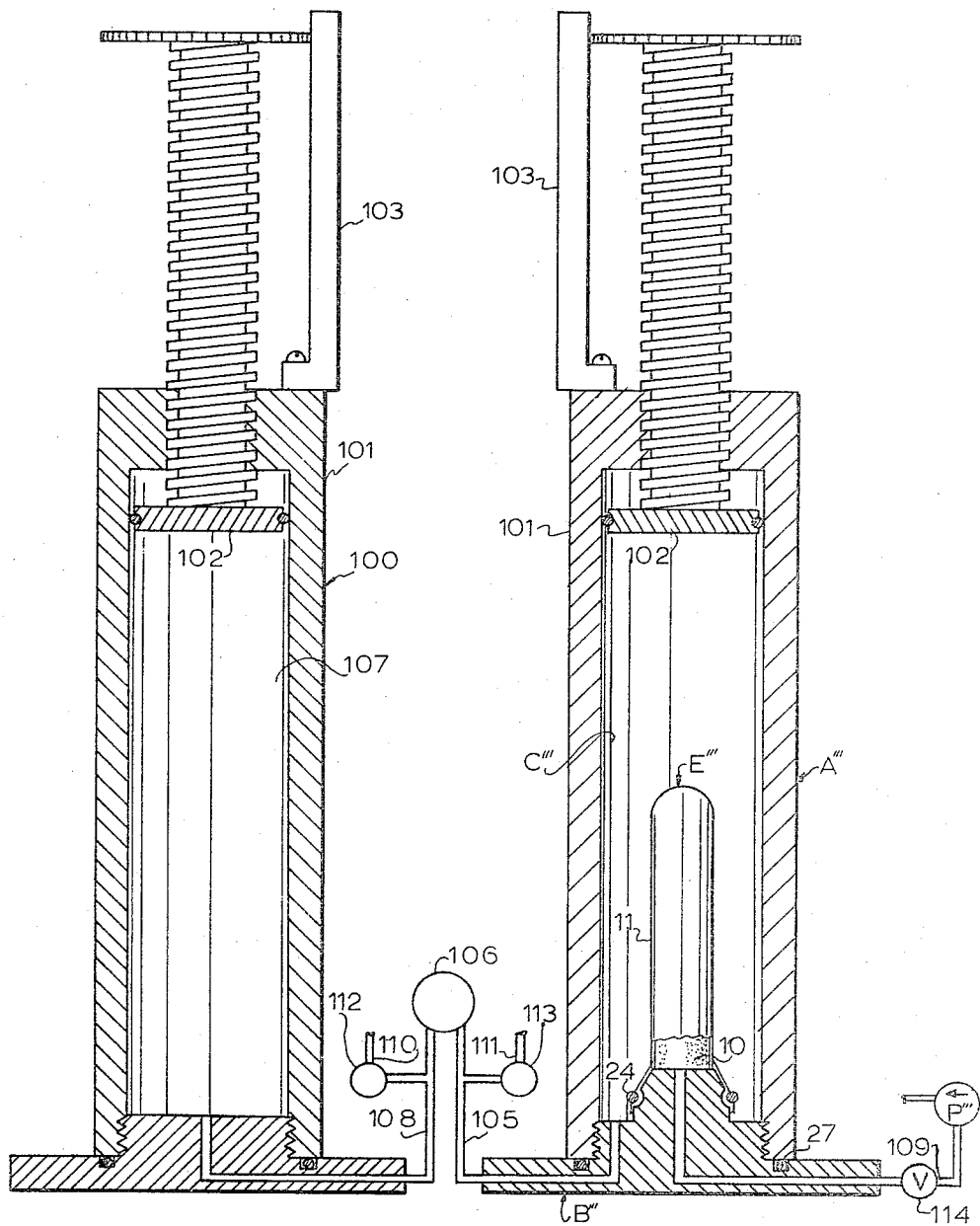
FIG. 5 is a section view of an embodiment of the apparatus of the invention using a variable volume specimen chamber and a variable volume gas chamber.

In the embodiment of the apparatus shown in FIG. 5, the specimen chamber A''' is substantially identical to the specimen chamber A''. However, in this embodiment, the specimen chamber A''' is used in combination with a gas chamber 100. The gas chamber 100 is substantially identical to the specimen chamber A''' with the exception that there is no truncated cone 17'''. Accordingly, the specimen chamber A''' and the gas chamber 100 will not be described in detail since it will be understood that each has a hollow cylinder 101, a sealing disc 102, a cavity C''' or 107 respectively, and a scale standard 103 having indicia 104 positioned to indicate the volume of the cavity C''' or 107.

The cavity C''' of the specimen chamber A''' is joined by a first connecting means 105 to one side of a differential pressure gauge 106 of known type, the cavity 107 of the gas chamber 100 is joined by a second connecting means 108 to the second side of the differential pressure gauge 106, and the envelope E''' is joined by a third connecting means 109 to the pump P'''. The first connecting means 105 opens to the atmosphere through a fourth connecting means 110 and the second connecting means 108 opens to the atmosphere through a fifth connecting means 111. A valve 112 is in the fourth connecting means 110 between the atmosphere and the first connecting means 105, a valve 113 is in the fifth connecting means 111 between the atmosphere and the second connecting means 108, and a valve 114 is in the third connecting means 109 between the cavity C''' and the pump P'''.

When the embodiment of the invention shown in FIG. 5 is used to determine the bulb volume and pore volume of a specimen 10 of solid material, the specimen 10 enclosed within the shield 11 is placed within the specimen chamber C''' as previously described to form the envelope E''' and with the valves 112, 113, and 114 open, the pump P''' is operated to create a partial vacuum in the envelope E'''. This insures that the shield 11 conforms closely to the bulk shape of the specimen 10.

After the partial vacuum is established in the envelope E''', the valves 112, 113, and 114 are closed and the sealing disc 102 of the gas chamber lowered until the volume of the cavity 107 is reduced by one-half. This causes a deflection of the differential pressure gauge 106 and the sealing disc 102 of the specimen chamber A''' is lowered until the differential pressure gauge 106 again indicates equal pressures in the cavities 107 and C'''. The relationship between air pressure and volume before and after this motion of the sealing discs 102 can be expressed as follows:

$$P_1(V_m - V_b) = 2P_1(V_{mr} - V_b) \quad (7)$$

or $$V_b = 2V_{mr} - V_m \quad (8)$$

The pressure relationship expressed is known to exist because in accordance with the known laws of gas behavior, the motion of the sealing disc 102 in the gas chamber 100 doubled the pressure in the gas chamber 100. Thus, when the pressure in the specimen chamber A''' is equated to the pressure in the gas chamber 100, the pressure in the specimen chamber A''' is also doubled. When this is understood, it will also be understood that the relationship between air pressure and volume obtained with the apparatus of FIG. 5 is the same as that obtained with the apparatus of FIG. 4 and that the bulk volume of the specimen 10 can be easily and conveniently determined.

The procedure described above is repeated with the shield 11 removed from the specimen 10 when the apparatus shown in FIG. 5 is used to determine pore volume. The resulting relationship between air pressure and volume is as follows:

$$P_1(V_m - V_s) = 2P_1(V_{mr} - V_s) \quad (9)$$

or $$V_s = 2V_{mr} - V_m \quad (10)$$

This is the same relationship as that obtained with the embodiment of the apparatus shown in FIG. 4. Thus, it permits solid volume, $V_s$, and in turn, pore volume to be determined using the apparatus of FIG. 5 in substantially the same manner as the apparatus of FIG. 4. It will be understood that in calibrating and using the embodiment of the apparatus, the volumes of the connecting means 105, 108, 109, 110, and 111 are known and taken into consideration so that highly accurate results are also obtained.

It will be understood from the foregoing that each embodiment of the apparatus of the invention permits the porosity of a specimen 10 of solid material to be determined using only gas displacement techniques. It will also be understood that a shield 11 may be used even with solid material in powdered form and that the apparatus of the invention is not limited to use with solid materials having certain shapes or other properties.

It will be obvious to those skilled in the art that many variations may be made in the embodiments here chosen for the purpose of illustrating the present invention without departing from the scope thereof as defined by the appended claims.

We claim:

1. Apparatus for obtaining data relating to the porosity of a specimen of porous material by the displacement of a gas, said apparatus comprising sealing means for sealing the pores of the specimen, said sealing means forming an envelope around the specimen; enclosing means for enclosing the envelope within a gas-tight cavity; valve means for selectively permitting the entry of the gas into the cavity and into the envelope; and measuring means for determining the volumes of the gas which enter the cavity and the envelope.

2. Apparatus for obtaining data relating to the porosity of a specimen of porous material by the displacement of a gas, said apparatus comprising sealing means for sealing the pores of the specimen, said sealing means forming a gas-tight envelope around the specimen; enclosing means for enclosing the envelope within a gas-tight cavity of known volume; valve means for selectively permitting the entry of the gas into the cavity and into the envelope; and measuring means for determining the volumes of the gas which enter the cavity and the envelope.

3. Apparatus for obtaining by the displacement of a gas data relating to the porosity of a specimen of porous material, said apparatus comprising sealing means for sealing the pores of the specimen, said sealing means having a known volume and forming a gas-tight closely-adhering envelope around the specimen; enclosing means for enclosing the envelope within a gas-tight cavity of known volume; valve means for selectively permitting the entry of the gas into cavity and into the envelope; and measuring means for determining the volumes of the gas which enter the cavity and the envelope, said measuring means having indicia calibrated in terms of the differences between the known volume of the cavity and the volumes of the gas which enter the cavity.

4. Apparatus for obtaining data relating to the porosity of a specimen of porous material by the displacement of a gas, said apparatus comprising sealing means for sealing the pores of the specimen, said sealing means forming an envelope around the specimen; enclosing means for enclosing the envelope in a cavity; reservoir means for holding the gas; valve means for selectively releasing the gas from the reservoir means to the envelope and the cavity; and pressure responsive means for indicating the pressure of the gas in the reservoir means.

5. Apparatus for obtaining data relating to the porosity of a specimen of porous material by the displacement of a gas, said apparatus comprising sealing means for sealing the pores of the specimen, said sealing means having a known volume and an inner surface which closely adheres to the specimen so as to form a gas-tight envelope; enclosing means for enclosing the envelope in a gas-tight cavity having a known volume; reservoir means for holding the gas, said reservoir means having a known volume; valve means for selectively releasing the gas from the reservoir means to the envelope and the cavity; and pressure responsive means for indicating the pressure of the gas in the reservoir means.

6. Apparatus for obtaining data relating to the porosity of a specimen of porous material by the displacement of a gas, said apparatus comprising sealing means for sealing the pores of the specimen; the sealing means forming an envelope around the specimen, enclosing means for enclosing the specimen and the gas within a cavity having a variable volume; valve means for selectively permitting the entry of the gas into the cavity and into the envelope; indicating means for indicating the volume of the cavity; and pressure responsive means for indicating the pressure of the gas in the cavity.

7. Apparatus for obtaining data relating to the porosity of a specimen of porous material by the displacement of a gas, said apparatus comprising sealing means for sealing the pores of the specimen, said sealing means forming an envelope around the specimen; enclosing means for enclosing the specimen and the gas within a cavity having a variable volume; valve means for selectively permitting the entry of the gas into the cavity and into the envelope; indicating means for indicating the volume of the cavity; vacuum means for creating a vacuum in the envelope; and pressure responsive means for indicating the pressure of the gas in the cavity.

8. Apparatus for obtaining data relating to the porosity of a specimen of porous material by the displacement of a gas, said apparatus comprising sealing means for sealing the pores of the specimen, said sealing means having a known volume and being removably positionable around the specimen so as to form a gas-tight closely-adhering envelope; enclosing means for enclosing the specimen and the gas within a gas-tight cavity having a variable volume greater than the bulk volume of the specimen; valve means for selectively permitting the entry of the gas into the cavity and into the envelope; indicating means for indicating the volume of said cavity; vacuum means for creating a vacuum in the envelope; and pressure responsive means for indicating the pressure of the gas in the cavity.

9. Apparatus for obtaining data relating to the porosity of a specimen of porous material, said apparatus comprising sealing means for closing the pores of the specimen; the sealing means forming an envelope around the specimen, enclosing means for enclosing a first volume of the gas and the specimen in a cavity having a variable volume; gas retaining means for holding a second volume of the gas in a cavity having a variable volume; first adjusting means for selectively varying the volume of the cavity of the enclosing means; second adjusting means for selectively varying the volume of the cavity of the gas retaining means; valve means for selectively permitting the entry of the gas into the cavity and into the envelope; and indicating means for indicating when the gas pressure in the cavity of the enclosing means is equal to the gas pressure in the cavity of the gas retaining means.

10. Apparatus for obtaining data relating to the porosity of a specimen of porous material, said apparatus comprising sealing means for closing the pores of the specimen, said sealing means forming an evelope with a volume substantially equal to the bulk volume of the specimen; enclosing means for enclosing the specimen and a first volume of the gas in a cavity having a variable volume; gas retaining means for holding a second volume of the gas in a cavity having a variable volume; first adjusting means for selectively varying the volume of the cavity of the enclosing means; second adjusting means for selectively varying the volume of the cavity of the gas retaining means; valve means for selectively permitting the entry of the gas into the cavity and into the envelope; and indicating means for indicating when the gas pressure in the cavity of the enclosing means is equal to the gas pressure in the cavity of the gas retaining means.

11. Apparatus for obtaining data relating to the porosity of a specimen of porous material, said apparatus comprising sealing means for closing the pores of the specimen, said sealing means having a known volume and being removably positionable on the specimen so as to enclose the specimen in a gas-tight closely-adhering envelope with a volume substantially equal to the bulk volume of the specimen; enclosing means for enclosing a first volume of the gas and the specimen in a cavity having a volume variable from a maximum volume to a minimum volume larger than the volume of the said envelope; gas retaining means for holding a second volume of the gas in a cavity having a volume variable from a maximum volume substantially equal to the maximum volume of the cavity of the enclosing means; first adjusting means for selectively varying the volume of the cavity of the enclosing means; second adjusting means for selectively varying the volume of the cavity of the gas retaining means; valve means for selectively permitting the entry of the gas into the cavity and into the envelope; indicating means for indicating when the gas pressure in the cavity of the enclosing means is equal to the gas pressure in the cavity of the gas retaining means; and means for creating a vacuum in the said envelope.

References Cited by the Examiner

UNITED STATES PATENTS

| | | | |
|---|---|---|---|
| 2,667,782 | 2/1954 | Shea. | |
| 2,829,515 | 4/1958 | Johnson | 73—38 |
| 3,113,448 | 12/1963 | Hardway et al. | 73—149 |
| 3,255,122 | 6/1966 | Conslabares et al. | 73—38 X |

LOUIS R. PRINCE, *Primary Examiner.*

M. B. HEPPS, S. C. SWISHER, *Assistant Examiners.*